Aug. 22, 1939.　　　A. JOHNSON ET AL　　　2,170,055
DOUBLE SEAMER
Filed July 10, 1936　　　3 Sheets-Sheet 3
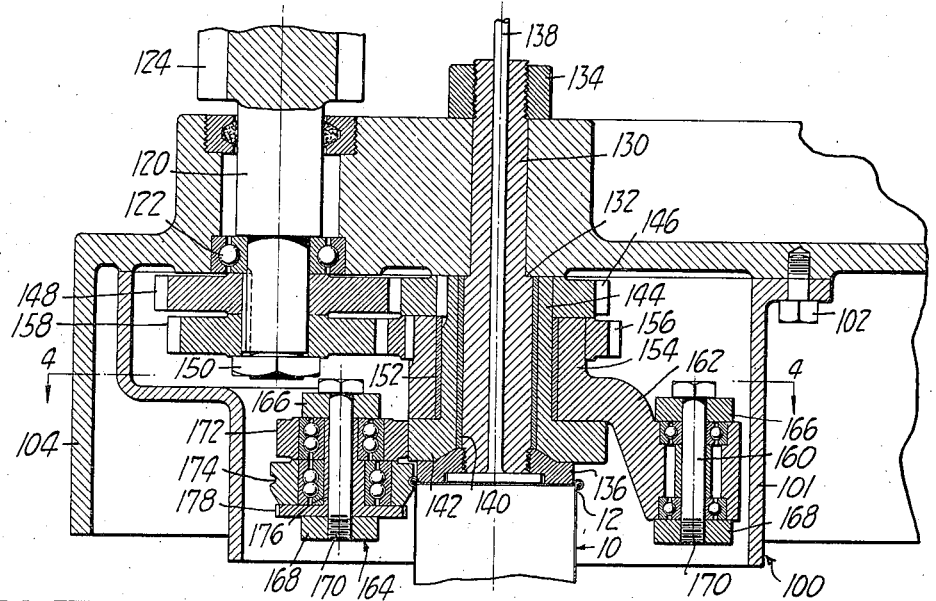
FIG_3_
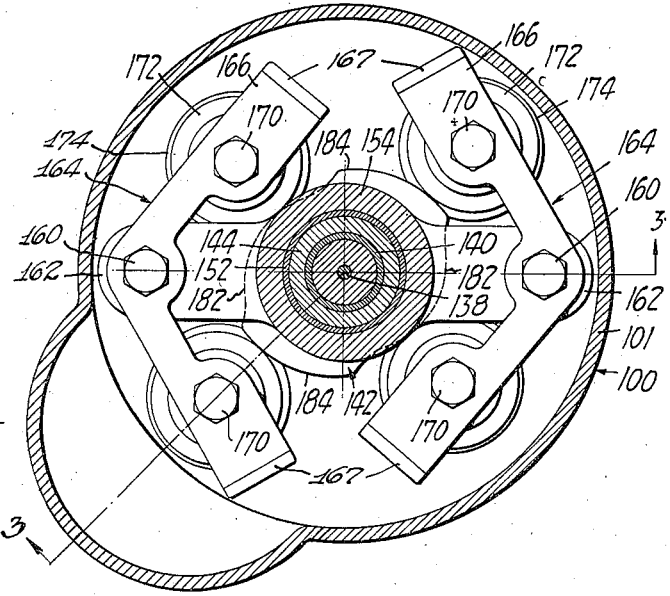
FIG_4_
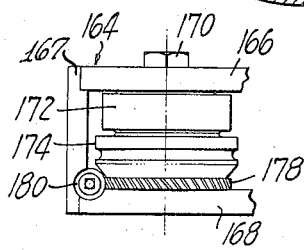
FIG_5_
INVENTORS
AXEL JOHNSON, DECEASED
by G.W. JOHNSON, L.A. JOHNSON, EXECUTORS
BY　GEORGE W. JOHNSON
Theodore H. Lassagne
ATTORNEY Patented Aug. 22, 1939

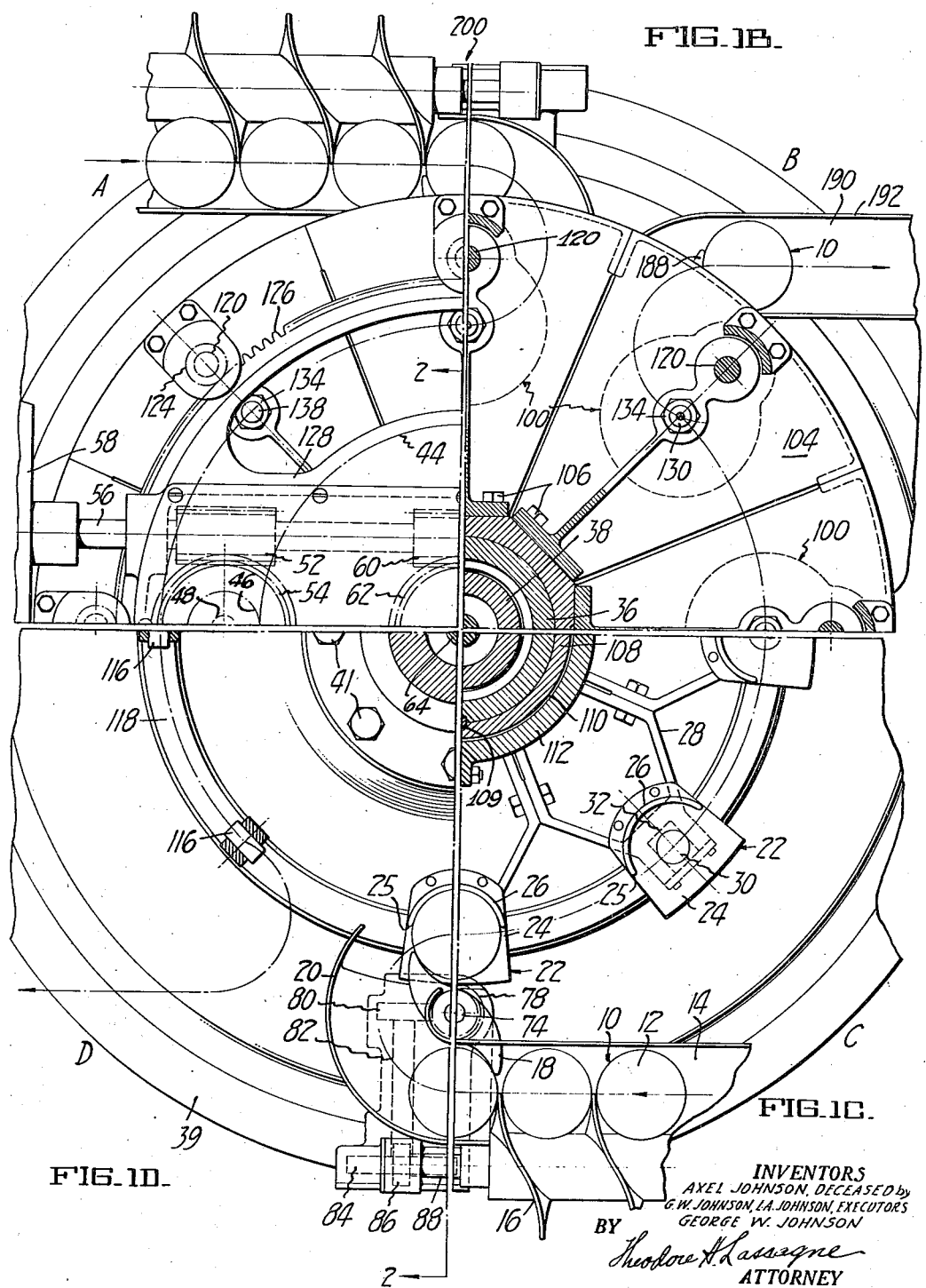

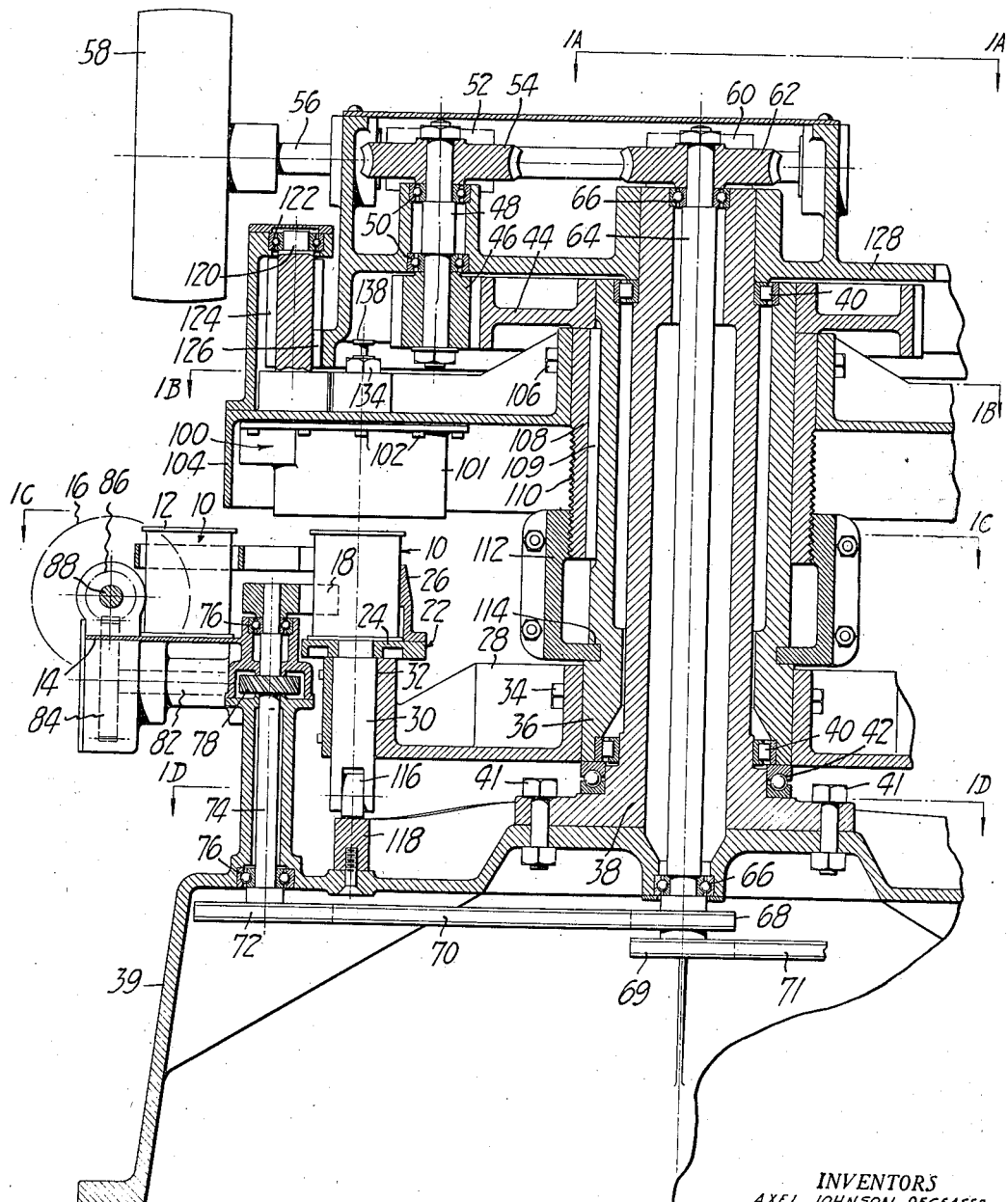

2,170,055

UNITED STATES PATENT OFFICE 2,170,055

DOUBLE SEAMER

Axel Johnson, deceased, late of Oakland, Calif., by George Walter Johnson and Lloyd A. Johnson, executors, Oakland, Calif., and George Walter Johnson, Oakland, Calif.

Application July 10, 1936, Serial No. 89,940

3 Claims. (Cl. 113—24)

The present invention relates to improvements in double seamers for uniting can ends and can bodies, such machines being designed for use both in the manufacture of cans, for securing bottoms to the previously formed can bodies, and in canning plants for securing tops upon filled cans.

It is an object of the invention to provide a machine in which the cans will be subjected to a minimum of centrifugal force which would tend to cause slopping over of the contents.

It is a further object of the invention to provide a machine which may be readily adjusted to accommodate cans of various dimensions.

It is a further object of the invention to provide a seamer head of simple, efficient and durable construction, and which may be readily removed for repair or for replacement by a similar head to accommodate cans of different dimensions.

The foregoing and other objects ancillary thereto are preferably accomplished by feeding a double line of can bodies into co-operative relationship with a single multiple-spindle turret of seamer heads constructed and arranged substantially as hereinafter disclosed in detail, so that each line of can bodies may move along a curvilinear path comprising less than half of the path traversed by the seamer heads. By thus causing the can bodies to move upon a longer radius than in machines feeding a single line of can bodies, the centrifugal force acting upon the cans may be substantially reduced if their velocity is maintained the same as in the prior art machines, or their velocity may be increased without exceeding the centrifugal forces heretofore encountered, thus increasing the output of the machine.

The novel features characteristic of the invention are set forth with particularity in the appended claims. The invention itself, however, together with additional objects and advantages thereof, will be best understood from the following description of a specific embodiment, when read in connection with the accompanying drawings, in which:

Figure 1A is a plan view of one quadrant of the machine viewed as indicated by the line 1A—1A in Figure 2.

Figure 1B is a sectional view of one quadrant of the machine taken on the line 1B—1B of Figure 2.

Figure 1C is a sectional view of one quadrant of the machine taken on the line 1C—1C of Figure 2.

Figure 1D is a sectional view of one quadrant of the machine taken on the line 1D—1D of Figure 2.

Figure 2 is a vertical sectional view of a portion of the machine, taken on the line 2—2 of Figure 1;

Figure 3 is a vertical sectional view of the seamer head, taken on the line 3—3 of Figure 4;

Figure 4 is a horizontal sectional view of the seamer head, taken on the line 4—4 of Figure 3; and Figure 5 is a detail view, in elevation, of a seaming roller, illustrating the mechanism for adjustment thereof.

In the illustrated machine embodying the present invention, a feeding mechanism is provided for placing flanged can bodies upon individual holders therefor mounted upon a conveyor operating synchronously with the feeding mechanism, and adapted to carry the can bodies to an ejecting machine located adjacent the opposite side of the machine. The present machine consists of substantially duplicate halves, into each of which a line of can bodies is fed by identical mechanisms and out of which a line of completed cans is ejected.

As illustrated in Figure 1, flanged can bodies 10, having end closures 12 laid upon their uppermost ends, are advanced along platform 14 by a rotating helical conveyor 16. As each can body is thus brought to the left end of the conveyor 16, it is engaged by one of a pair of rotating feed fingers 18 by which it is propelled under guidance of the curved guide plate 20 onto one of a series of can holders 22, each of which comprises a platform portion 24 and an abutment member 26 fixed thereto against which the can body is moved by the feed finger 18.

A series of these can holders 22 is carried by the rotatable spider 28 (see also Figure 2), being supported for vertical movement with respect to the spider 28 by a post 30 extending downwardly from the platform portion 24 into sockets 32 equally spaced about the periphery of the spider 28.

Means are provided for rotating the can holders 22 to carry them successively past the feeding station.

Spider 28 is fixed by means such as bolts 34 to a rotatable sleeve 36 rotatably mounted, by radial bearings 40 and thrust bearings 42, upon a fixed central sleeve 38 secured to the machine base 39 by bolts 41. Fixed to the rotatable sleeve 36 adjacent the upper end thereof is a gear 44 meshing with a pinion 46 fixed to shaft 48. This shaft is mounted in frame bearings 50 and is adapted to be driven by worm 52 meshing with through worm gear 54 fixed adjacent the opposite end of the shaft. Worm 52 is fixed upon the main drive shaft 56 adapted for connection to a prime mover through means such as the belt pulley 58.

The can feeding and ejecting mechanism is operated in synchronism with this mechanism. Also fixed to the main drive shaft 56 is a second worm 60, meshing with a worm gear 62 fixed to a shaft 64 rotatably mounted within the fixed central sleeve 38, upon bearings 66. Fixed adjacent the lower end of the shaft 64 is a sprocket wheel 68 connected by drive chain 70 with a sprocket wheel 72 fixed on the lower end of one of the feeding mechanism drive shafts 74 and also passing over a similar sprocket wheel (not shown) fixed on the lower end of one of the ejector mechanism drive shafts. Also fixed on the lower end of shaft 64 is a second sprocket wheel 69 connected by a second chain 71 with sprocket wheels carried on the opposite feeding and ejecting mechanisms to drive the same.

The feeding mechanism drive shaft 74 (Figure 2) is journaled in bearings 76 in the frame and has fixed thereto a spiral gear 78 meshing with a similar spiral gear 80 (see also Figure 1) fixed on the countershaft 82 which carries on its opposite end a spiral gear 84 meshing with another spiral gear 86 fixed to the shaft 88 on which the helical feeding mechanism 16 is carried. The feeding fingers 18 heretofore mentioned are fixed adjacent the upper end of the feeding mechanism drive shaft 74.

From the foregoing it will be apparent that as the main drive shaft 56 is rotated the helical feeding mechanism 16 will be driven through worm 60, worm gear 62, shaft 64, sprocket 68, chain 70, sprocket 72, feeding mechanism drive shaft 74, gears 78 and 80, shaft 82, gears 84 and 86, and shaft 88, to advance can bodies 10 along the platform 14 to a position where they may be engaged sequentially by one or the other of the feed fingers 18, also driven through the same connections with the main drive shaft 56 and therefore operating synchronously with the helical feeding mechanism 16.

As each can body 10 reaches the position in which it may be engaged by a feed finger 18, it will be carried by one of said fingers onto one of the moving can holders 22 carried upon spider 28, driven from the main drive shaft 56 through worm 52, worm gear 54, shaft 48, gear 46, gear 44, and sleeve 36 upon which the spider 28 is mounted. Since both the spider moving mechanism and the can feeding mechanism are geared to the main drive shaft 56, it is apparent that they will be synchronously operated. A can body will be fed onto each of the can holders 22 just as it reaches the position in which the trailing edge 25 of its abutment portion 26 aligns with the edge of the guide plate 20, thus ensuring a proper feeding of the can body into the holder.

A series of double seamer heads, designated generally as 100, one for each of the can holders 22, is also mounted upon the rotating sleeve 36, provision being made for vertical adjustment of the seaming heads 100 with respect to the can holders 22 in order that cans of different height may be readily accommodated. Since the seaming heads 100 are identical in construction, only one of them need be described.

Each seaming head casing 101 is removably secured, by bolts 102 or the like, to one of a series of segmental seaming head carriers 104 forming a multiple spindle turret, which in turn is removably secured, by means such as bolts 106, to a vertically adjustable sleeve 108 having a key 109 extending into a key way in the rotatable sleeve 36, so that sleeve 108 may be moved vertically with respect to sleeve 36 but may not rotate with respect thereto. The adjustable sleeve 108 is provided with threads 110, adapted to be engaged by complementary threads on the adjusting nut 112 provided with a splined connection 114 with sleeves 38, so that it may be rotated with respect to sleeve 38 to raise or lower the adjustable sleeve 108 and thereafter retain said sleeve in the set vertical position. In this manner the seaming head 100 may be raised and lowered to accommodate cans of varying height.

From the foregoing it will be apparent that upon rotation of sleeve 36 the can holders 22 and the seaming heads 100 will rotate about the central sleeve 38 together. As each can holder 22 leaves the feeding station where a can body has been placed upon it by the feeding mechanism hereinbefore described, it is automatically raised to bring the head of the can carried thereon into co-operative relationship with the seaming mechanism carried in the seaming head 100. Each can holder 22 is vertically movable with respect to the spider 28, being mounted upon a post 30 carried in a socket 32 in said spider. Journaled in the post 30 adjacent its lower end is a roller 116 which rides upon the upper edge of a cam 118 fixed on the base 39. This cam serves to raise each can holder 22 as it leaves the feeding station, so that the can is brought into co-operative relationship with the mechanism of the seaming head 100 hereinafter described. Thereafter a dwell on the cam serves to maintain such relationship until the can approaches the ejecting station, when the holder 22 is lowered, so that the finished can may be ejected and another can body received in the holder at the contiguous feeding station.

During the period when each can body is thus maintained in co-operative relationship with the mechanism of the seaming head 100, the can end 12, which has been laid upon the can body 10 in the course of the feeding operation, is secured to said can body by the seaming mechanism shown in detail in Figures 3, 4 and 5. This seaming mechanism is driven through shafts 120 (Figure 2) journaled in bearings 122 in the seaming head carriers 104 and each of which is provided adjacent its upper end with a broad-faced gear 124 meshing with gear teeth 126 (see also Figure 1) extending around the periphery of the frame member 128. The gear 124 is made with a broad face so that it may be maintained in mesh with teeth 126 throughout the range of vertical adjustment of the seaming head carrier 104 by means of the adjusting nut 112 heretofore described. From the foregoing it will be apparent that as the seaming head carriers 104 are rotated about the central sleeve 38 by the means hereinbefore described, gears 124 will be rotated by the stationary teeth 126 of the frame member.

Within each seaming head 100 is mounted double seaming mechanism supported upon a shaft 130 (Figures 3 and 4) provided with a shoulder 132 adapted to engage the seaming head carrier 104 and a nut 134 by which the mechanism is removably secured to the seaming head carrier 104. The casing 101 of the seaming head 100 is also removably secured to the seaming head carrier 104 by means such as bolts 102.

Fixed on the lower end of shaft 130 is a chuck 136 proportioned to engage the can head 12 and enter a short distance into the can body 10 to prevent the collapse thereof during the seaming operation. A knockout member 138 also extends through shaft 130 to engage the head 12 of a finished can and free the same from the chuck in order to secure proper ejection therefrom the machine, as hereinafter described.

Rotatably mounted on roller sleeve bearing 140 surrounding the shaft 130 is a seaming tool control cam 142, having a sleeve extension 144 adjacent the opposite end of which is keyed a gear 146 meshing with a drive gear 148 keyed to the drive shaft 120 and retained thereon by nut 150 on the end of said shaft. Also mounted for rotation about shaft 130 on roller bearings 152 is a seaming tool hub 154 having a gear 156 keyed adjacent one end thereof and meshing with a gear 158 also keyed on shaft 120 and retained by nut 150.

Pivotally mounted at 160 on arms 162 extending from the seaming tool hub 154 are seaming tool carriers 164, comprising upper plates 166 and lower plates 168 connected by end members 167 and between which are journaled, on pins 170, rollers 172 contacting the periphery of the cam 142 and seaming rollers 174, the construction of which is well known in the art of double seaming machines. One oppositely disposed pair of the rollers 174 are roughing rollers, while the other pair are finishing rollers according to the usual practice. The seaming tool carriers 164 are sufficiently resilient to permit passage of the vertical seam of the can body under roller 174 without introducing excessive strains.

The cam rollers 172 and the seaming rollers 174 are mounted upon a sleeve 176, the portion of said sleeve lying between the pins 170 and the cam rollers 172 being concentric with said pins, but the portion lying between the pins and the seaming rollers 174 being eccentric with respect to the pins 170. Fixed to one end of the sleeve 176 is a gear 178 (Figure 5) meshing with a worm 180 journaled on the seaming tool carrier 164 and rotatable by means of a key to effect rotation of the sleeve 176 and by means of its eccentric portion to move its seaming rollers 174 so that the pressure which may be exerted by them against the work may be adjusted.

In the operation of this seaming head, rotation of the shaft 120 will, through gears 148, 146, 158 and 156, rotate both the cam 142 and the seam tool hub 154 about the shaft 130, but, due to the difference in pitch diameter of the gears 146 and 156 and their meshing gears, the cam 142 will rotate at a slightly higher speed than the seaming tool hub 154. In the presently illustrated machine, the drive of the cam 142 is so designed as to cause it to gain one rotation on the seaming tool hub 154 for each sixteen rotations of the latter.

As each can body 10 is moved upwardly into co-operative relationship with the seaming head 100 by the cam 118, as heretofore described, one pair of the cam rollers 172 will be traversing the intermediate portion 182 of the cam 142 so that all of the seaming tools 174 will lie in intermediate positions permitting free engagement of the can head and end with the chuck member 136. Immediately thereafter, these rollers 172 will ride upon the higher portion 184 of the cam 142, causing the roughing rollers 174 to be brought into contact with the edges of the can head 12, and, after about four rotations of the roughing rollers 174, the high portion 184 of cam 42 will pass under the next pair of rollers 172 to rock the seaming tool carriers 164 about their pivots 160 and bring the finishing rollers 174 into contact with the partially formed seam of the can end. After about four rotations of the finishing rollers 174 about the can body, the can holder 22 is permitted to lower by the cam 118 and the knockout 138 is operated to free the can from the chuck 136, thus ensuring that the can will continue to move with the can holder 22 to the ejecting station. This knockout may be operated by any conventional means, such as a cam fixed on the frame.

At the ejecting station the can body, having the end seamed thereto, is engaged by an ejecting finger 188 coinciding in construction to the feed finger 18 described in connection with the can feeding mechanism and operated by substantially identical driving mechanism which is not therefore shown in detail. By this means the finished can is removed from the can holder 22 and ejected under guidance of a guide plate 192 coinciding in conformation to the guide plate 20 at the feeding station heretofore described, and is moved along a platform 190.

At a second feeding station, generally designated 200 and identical in construction with the feeding station heretofore described in detail, a second line of can bodies is fed into the machine for discharge at a second discharge station located diametrically opposite the one previously described. This arrangement makes it possible to substantially decrease the centrifugal force exerted upon the cans in transit in the curvilinear path, which is of substantial importance in handling filled cans, in that it minimizes the slopping over of the contents. This is because the speed of rotation of spider 28 may be reduced by half without decreasing the output of finished cans. Although the can holders 22 move on a longer radius, their velocity is not increased, and the centrifugal force acting upon them is therefore substantially reduced.

The seaming heads may easily be removed individually for repair or for replacement by other heads designed to handle cans of different diameter, merely by removing the nut 134 retaining the supporting shaft 130, which shaft may then be withdrawn from its seat in the seamer head carrier 104. Gears 146 and 156 slide easily out of mesh with gears 148 and 158, since gear 146 is somewhat smaller in diameter than gear 156. Thus the entire mechanism supported upon shaft 130 may be removed from its casing 101 by a simple manipulation.

Although a specific embodiment of the invention has been described herein, it will be apparent to those skilled in the art that many modifications thereof are possible, and it is understood, therefore, that the invention is not to be considered as restricted except insofar as is necessitated by the prior art and by the spirit of the appended claims.

We claim:

1. In a can seaming machine having a rotatable turret and a plurality of seamer heads carried thereby; the combination of a plurality of concurrently operable devices disposed at a plurality of stations adjacent said turret for feeding assembled can bodies and ends into position for seaming operations thereon by said heads, and discharge means for seamed cans located adjacent each of said stations for discharging cans fed into the machine at a remote feeding station.

2. In a seamer head, a supporting shaft, a seaming tool hub rotatably mounted thereon, a plurality of seaming tool carriers rockably mounted on said hub, a control cam rotatably mounted on said shaft, and means comprising a plurality of cam followers on each of said carriers, cooperating with a single peripheral surface of said cam to effect positive rocking movement of said carriers toward and from the axis of said shaft.

3. A seaming tool carrier comprising a lever; means for pivotally supporting said lever intermediate its ends; a seaming roller journaled upon said lever adjacent each of the ends thereof, the axes of the seaming rollers being parallel to the pivotal axis of the lever; and a cam follower roller journaled upon said lever substantially coaxially with each of said seaming rollers.

GEORGE WALTER JOHNSON,
LLOYD A. JOHNSON,
*Executors of the Estate of
Axel Johnson, Deceased.*
GEORGE WALTER JOHNSON.